(12) United States Patent
Gonchar et al.

(10) Patent No.: US 11,781,782 B2
(45) Date of Patent: Oct. 10, 2023

(54) INDICATION OF MOTOR SHAFT ROTATION AND CONTROLLER LOCATION

(71) Applicant: CARRIER CORPORATION, Palm Beach Gardens, FL (US)

(72) Inventors: Richard Gonchar, Burlington, CT (US); Robert Ellett, Dawsonville, GA (US); Carlos Chamorro, Powder Springs, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 153 days.

(21) Appl. No.: 17/355,450

(22) Filed: Jun. 23, 2021

(65) Prior Publication Data

US 2022/0415140 A1 Dec. 29, 2022

(51) Int. Cl.
*F24F 13/14* (2006.01)
*F24F 11/52* (2018.01)
*G01M 99/00* (2011.01)

(52) U.S. Cl.
CPC ........ *F24F 13/1426* (2013.01); *F24F 11/52* (2018.01); *G01M 99/008* (2013.01); *F24F 2013/1433* (2013.01)

(58) Field of Classification Search
CPC ................ F24F 13/1426; F24F 11/52; F24F 2013/1433; G01M 99/008
See application file for complete search history.

(56) References Cited

U.S. PATENT DOCUMENTS

| 3,465,184 A | 9/1969 | Armstrong et al. |
| 3,832,842 A | 9/1974 | Parker |
| 6,028,523 A | 2/2000 | Thibodeaux et al. |
| RE37,245 E | 6/2001 | Scholten et al. |
| 7,321,212 B2 | 1/2008 | Lewis |
| 7,355,520 B2 | 4/2008 | Mehlhorn |
| 8,125,346 B2 | 2/2012 | Ballard et al. |
| 9,976,763 B2 | 5/2018 | Leeland et al. |

(Continued)

FOREIGN PATENT DOCUMENTS

| CN | 107070095 A | 8/2017 |
| CN | 111179773 A | 5/2020 |

(Continued)

OTHER PUBLICATIONS

Eibmarkt GmbH, "LED phase sequence indicator 1414", accessed May 20, 2021, available at: https://www.eibmarkt.com/us/products/Mennekes-LED-phase-sequence-indicator-1414.html?utm_source=Portalexport&utm_medium=CPC&utm_term=Produktaktion&utm_campaign=GoogleShopping_US&userLocale=US&gclid=EAlalQobChMIr6qy1eCs8AIVpQalCR067w96EAQYASABEgLsn_D_BwE, 3 pages.

(Continued)

*Primary Examiner* — Marc E Norman
(74) *Attorney, Agent, or Firm* — CANTOR COLBURN LLP

(57) ABSTRACT

Embodiments are provided for a method for verifying operation of a variable air valve (VAV) equipment. Embodiments can include operating a motor having a motor shaft coupled to VAV equipment in one of a plurality of modes, and controlling a direction of rotation of the motor shaft coupled to the VAV equipment. Embodiments can also include providing an indication of the direction of rotation of the motor shaft coupled to the VAV equipment. Also provided are embodiments for a system that is used for verifying the operation of VAV equipment.

17 Claims, 4 Drawing Sheets

(56) References Cited

U.S. PATENT DOCUMENTS

| | | |
|---|---|---|
| 10,481,034 B2 | 11/2019 | Son et al. |
| 10,539,970 B2 | 1/2020 | Leeland et al. |
| 2005/0208888 A1* | 9/2005 | Moore .................... F24F 11/76 |
| | | 454/334 |
| 2009/0111373 A1* | 4/2009 | Hollender ................ F24F 11/56 |
| | | 454/333 |
| 2009/0181611 A1* | 7/2009 | Hollender ........... F24F 13/1426 |
| | | 248/220.21 |
| 2015/0168004 A1 | 6/2015 | Emmons et al. |
| 2019/0294186 A1 | 9/2019 | Ploegert et al. |
| 2020/0173645 A1* | 6/2020 | Singh ..................... F21V 15/01 |
| 2020/0224901 A1 | 7/2020 | Spors et al. |
| 2021/0164679 A1 | 6/2021 | Friend |

FOREIGN PATENT DOCUMENTS

| | | |
|---|---|---|
| DE | 3500899 A1 | 7/1986 |
| EP | 3660411 A1 | 6/2020 |
| GB | 465461 A | 4/1937 |
| KR | 2020120005436 U | 7/2012 |
| KR | 1020200042887 A | 4/2020 |

OTHER PUBLICATIONS

Omega Engineering, "Motor Rotation Indicator—Clockwise or Counter-Clockwise Motor Rotation", accessed May 20, 2021, available at: https://www.omega.com/en-us/accessories/electrical-components/transformers/p/MTR-1-Series , 2 pages.

European Search Report for Application No. 22165871.9; dated Sep. 26, 2022; 7 Pages.

\* cited by examiner

INDICATION OF MOTOR SHAFT ROTATION AND CONTROLLER LOCATION

BACKGROUND

The present invention relates to heating, ventilation, and air conditioning, and more specifically, to indicating motor shaft rotation and controller location.

Heating, ventilation, and air conditioning systems (HVAC) systems are commonly used to regulate the temperature and humidity levels of enclosed areas. HVAC systems include several components such as compressors, condensers and evaporators to generate desired heating and cooling. Also, HVAC systems can include conduit, handlers, and dampers to control the direction and volume of airflow in various zones. Over time, the components of the HVAC system may begin to fail and require maintenance. Before to performing maintenance on the HVAC system, the operation of the various components may be tested and verified by service technicians when trouble-shooting an issue. There may be a need to provide an efficient means for verifying the operation of the components in remote locations.

BRIEF DESCRIPTION

According to an embodiment, a method for verifying operation of a variable air volume (VAV) equipment is provided. The method includes operating, by a controller, a motor having a motor shaft coupled to VAV equipment in one of a plurality of modes; controlling, by the controller, a direction of rotation of the motor shaft coupled to the VAV equipment; and providing, by the controller, an indication of the direction of rotation of the motor shaft coupled to the VAV equipment.

In addition to one or more of the features described herein, or as an alternative, further embodiments include VAV equipment that is a damper, wherein the damper is operable to be rotated in a first direction and a second direction to adjust a volume of airflow.

In addition to one or more of the features described herein, or as an alternative, further embodiments include using an indication that is provided by a circular LED array, wherein the circular LED array is illuminated and rotated in the direction of motor shaft.

In addition to one or more of the features described herein, or as an alternative, further embodiments include operating in a plurality of modes such as a location mode, a remote verification mode, and a disabled mode.

In addition to one or more of the features described herein, or as an alternative, further embodiments include a location mode that illuminates an LED array and operates the LED array as a strobe to identify a controller of a plurality of controllers that is currently being accessed.

In addition to one or more of the features described herein, or as an alternative, further embodiments include a remote verification mode that illuminates an LED array and rotates the LED array in the direction of rotation of the motor shaft.

In addition to one or more of the features described herein, or as an alternative, further embodiments include engaging a clutch of the controller to release the motor from a shaft of the VAV equipment.

In addition to one or more of the features described herein, or as an alternative, further embodiments include using the clutch that is disengaged, using a push button arranged on the controller, to release the motor from a shaft of the VAV equipment.

According to an embodiment, a system for verifying operation of a variable air volume (VAV) equipment is provided. The system includes a controller; VAV equipment, wherein the controller is coupled to the VAV equipment; and an indicator coupled to the controller, wherein the indicator is configured to be illuminated and rotated in a direction of rotation of a motor shaft coupled to the VAV equipment. The controller is configured to operate a motor coupled to the VAV equipment in one of a plurality of modes; control the direction of rotation of the motor coupled to the VAV equipment; and provide an indication of the direction of rotation of the motor coupled to the VAV equipment.

In addition to one or more of the features described herein, or as an alternative, further embodiments include VAV equipment that is a damper, wherein the damper is operable to be rotated in a first direction and a second direction.

In addition to one or more of the features described herein, or as an alternative, further embodiments include an indicator that is provided by a circular LED array, wherein the circular LED array is illuminated and rotated in the direction of motor shaft.

In addition to one or more of the features described herein, or as an alternative, further embodiments include a controller that is further configured to operate the VAV equipment in at least one of a location mode or a remote verification mode.

In addition to one or more of the features described herein, or as an alternative, further embodiments include a location mode that illuminates an LED array and operates the LED array as a strobe to identify which controller of a plurality of controllers is being accessed.

In addition to one or more of the features described herein, or as an alternative, further embodiments include a remote verification mode that illuminates and rotates the LED array in the direction of rotation of the motor shaft.

In addition to one or more of the features described herein, or as an alternative, further embodiments include at least one of a server or a user device used to configure a mode of operation.

In addition to one or more of the features described herein, or as an alternative, further embodiments include a clutch of the controller to release the motor from a shaft of the VAV equipment.

In addition to one or more of the features described herein, or as an alternative, further embodiments include a push button that is configured to disengage the clutch to release the motor from a shaft of the VAV equipment.

In addition to one or more of the features described herein, or as an alternative, further embodiments include the push button having a lens to enable the LED array to be visible external to the controller.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Oftentimes equipment for the heating, ventilation and air conditioning (HVAC) systems are located in areas that are high and out of reach of a technician without the assistance of a ladder or some other type of equipment that can be used in the visual inspection of the variable air volume (VAV) equipment. For example, VAV equipment such as dampers are arranged under the roof of the building and are not conveniently accessible for inspection by a technician.

The dampers can adjust the volume of airflow by controlling a panel attached to a motor shaft. The shaft can be operated in a clockwise direction and a counterclockwise direction to adjust the volume of airflow to allow a large range of airflow. The problem of verifying the operation of VAV equipment located at in remote areas is solved by providing a mechanism that provides a means of visual inspection of the operation of the VAV equipment from a distance. Therefore, the need for a ladder, a lift, or other equipment may be required to inspect the VAV equipment can be eliminated.

The mechanisms of one or more embodiments described herein enable the inspection and verification of the operation of the damper from a distance. In addition, one or more embodiments of aspects of the disclosure provide a method of locating the controller and VAV equipment that is being serviced and verification of damper motor shaft rotation by visual indication without the technician having to be next to the equipment.

Figure 1:
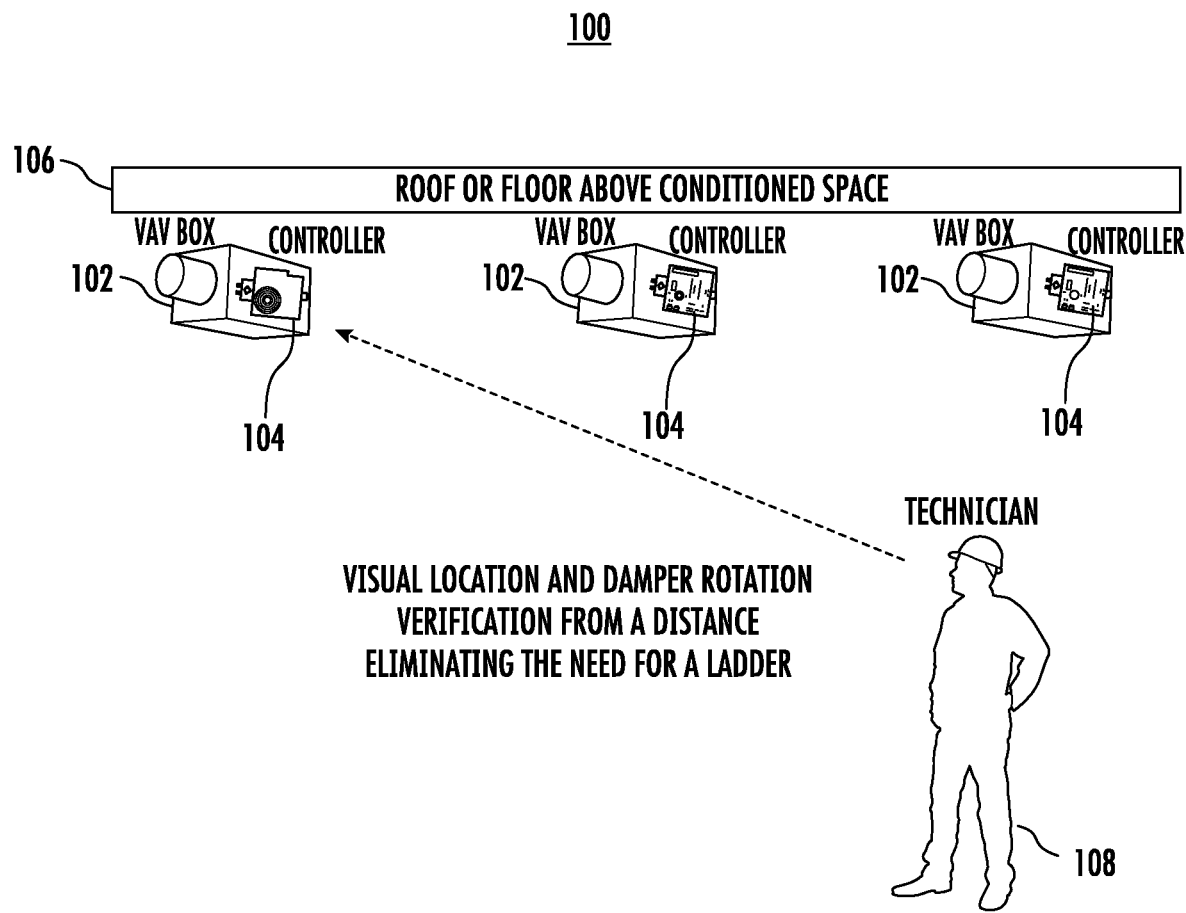
FIG. 1 depicts a system 100 used for remote visual verification of the operation of variable air volume (VAV) equipment in accordance with one or more embodiments of the disclosure.

FIG. 1 depicts a system 100 using a controller 104 that is used to verify the operation of VAV equipment 102 in accordance with one or more embodiments of the disclosure. As shown in FIG. 1, a plurality of VAV equipment 102 is located in the roof 106 of a building. A technician 108 located on the floor or ground level wishing to gain access to one of a plurality of VAV equipment 102 must use a ladder or other lift type equipment to physically inspect the equipment.

If a plurality of other VAV equipment 102 need to be inspected the ladder or lift must be moved from the first equipment to the next and so on until each of the VAV equipment 102 is inspected which can become very time-consuming as the number of equipment needing inspection increases. Also, each time the technician 108 uses a ladder or a lift, their safety may be at risk. The controller 104 can be used to control and verify the operation of VAV equipment 102.

Figure 2:
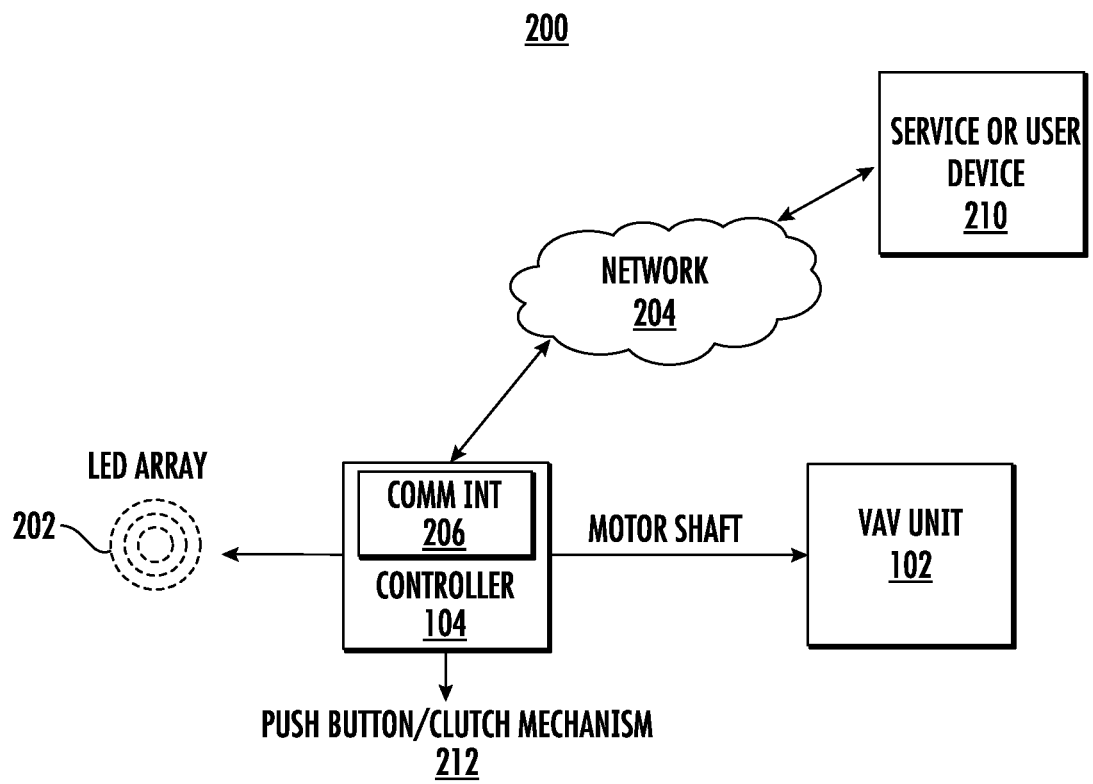
FIG. 2 depicts a block diagram of a system for verifying the operation of VAV equipment in accordance with one or more embodiments of the disclosure.

FIG. 2 depicts a block diagram of a system 200 used for indicating and verifying a variable air volume equipment damper motor shaft rotation and controller location during service and installation in accordance with one or more embodiments.

The controller 104 includes a microprocessor (not shown) that provides signals for controlling the VAV equipment 102 and the indicator or LED array 202. The microprocessor can control and operate the VAV equipment shaft in a clockwise direction and a counterclockwise direction. The LED array 202 can receive a signal to turn ON and illuminate the LED array 202. In addition, the LED array 202 can receive a signal to rotate the LED array 202 in the direction of the rotation of the VAV equipment 102. The rotation of the LED array 202 can provide the technician 108 with a visual indication of damper shaft rotation.

In one or more embodiments of the disclosure, the LEDs can be arranged in a circular pattern. In one or more embodiments of the disclosure, the LEDs can be arranged and mounted on the PCB. The circular pattern of LEDs can be arranged and illuminated in a sequence to indicate a direction of rotation of a motor shaft. For example, the sequence of illuminating the LEDs can indication a clockwise direction or a counterclockwise direction. The circular pattern of LEDs allows the technician 108 to immediately ascertain the direction of rotation of the damper. It should be understood that other mechanisms may be used to indicate a direction of rotation of the motor shaft of the damper such as, but not limited to, audible notifications, different arrangements of LEDs, or various sequencing of LEDs.

In one or more embodiments of the disclosure, a plurality of sets of LED rings may be used to increase the distance at which the visibility of the LEDs can be viewed. Each set of the LED rings can be simultaneously illuminated when operated in the location mode. As shown in FIG. 1, the leftmost controller 104 is under inspection.

FIG. 2 also depicts a pushbutton or clutch mechanism 212 that is used to disengage the damper shaft from the motor. The clutch mechanism 212 engages the damper shaft to the motor in the default position when the pushbutton is unpressed. The damper shaft can be manually rotated by a technician when the clutch mechanism 212 disengages the damper shaft from the motor when the pushbutton is depressed. When the pushbutton is released the damper shaft is re-engaged to the motor and the microprocessor can control the operation of the motor. The pushbutton can serve as a lens, light pipe, or transparent window to enable the LEDs that are mounted on the PCB to be visible external to enclosure of the system 200. In some embodiments of the disclosure, the LEDs will not be illuminated when the pushbutton is depressed, and the damper shaft is rotated. The LEDs can indicate the direction of rotation when the damper motor is under automatic control by the microprocessor.

A server or user device 210 can be used to communicate with the controller 104 through a communication interface 206 over a network 204. The server or user device 210 can communicate with the controller 104 via a network 204 such as a local area network connection utilizing a communication protocol such as WiFi or Bluetooth. It should be understood that other communication protocols for wired or wireless solutions can also be used to communicate with the controller 104 and is not limited to the examples described herein. In one or more embodiments of the disclosure, the operating mode of the LEDs can be configured, enabled, and/or disabled from an embedded server in the controller 104 through a mobile application or by a building automation network via its server.

Figure 3:
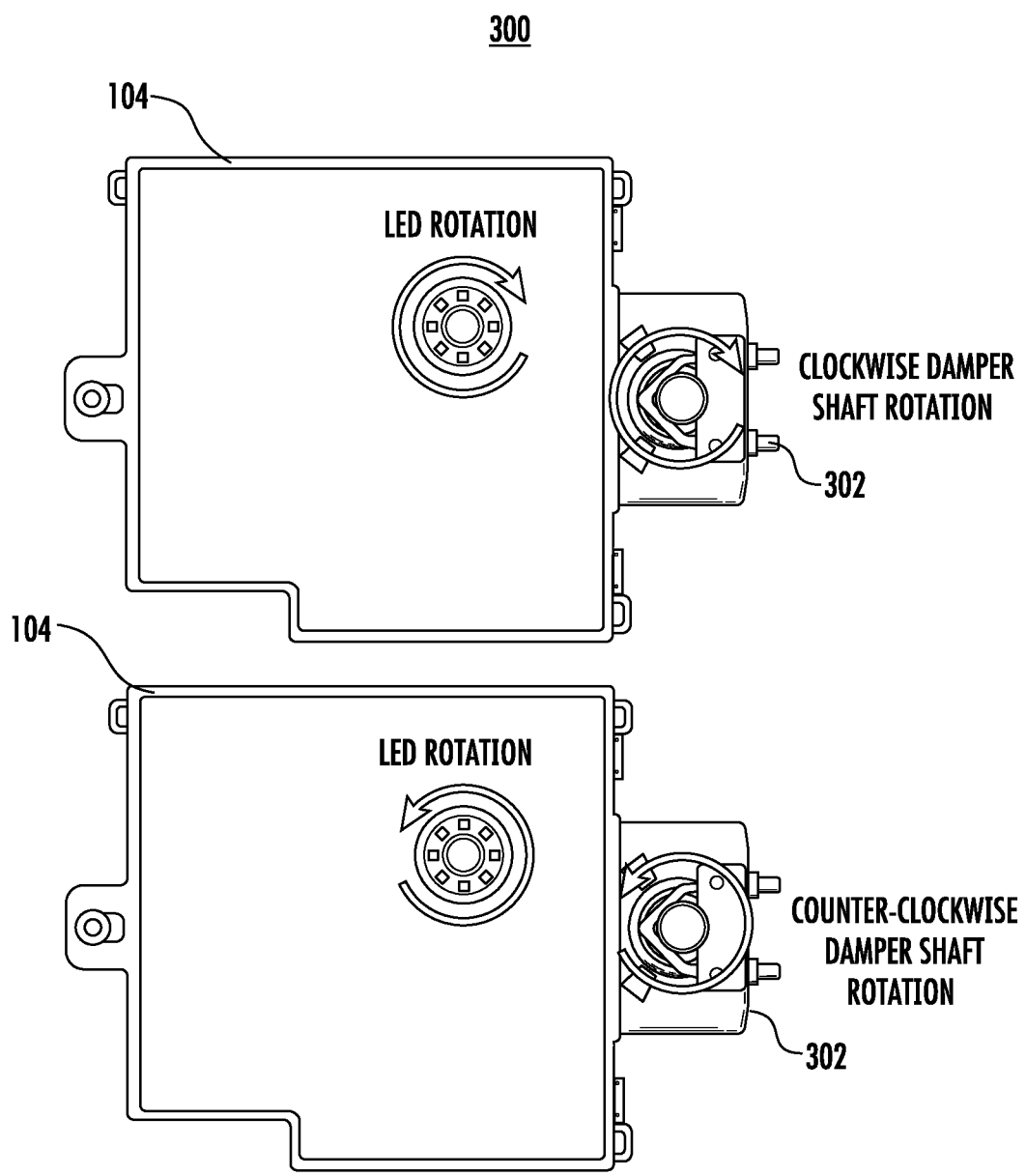
FIG. 3 depicts an example light-emitting diode (LED) array used for verifying the operation of VAV equipment in accordance with one or more embodiments of the disclosure.

FIG. 3 depicts an arrangement of the controller 104 that can be used for verifying the operation of VAV equipment 102 in accordance with one or more embodiments of the disclosure. The LED array 202 can be rotated in a clockwise direction responsive to a signal from a microprocessor (not shown) in controller 104 which indicates the clockwise rotation of the motor shaft. In one or more embodiments of the disclosure, the controller 104 can be coupled to the damper shaft using a U-clamp 302. Similarly, the LED array 202 can be rotated in a counterclockwise direction responsive to a signal from the microprocessor which indicates the counterclockwise rotation of the motor shaft.

The high-intensity LEDs of the LED array 202 enable a technician 108 to remotely verify the operation of the VAV equipment 102 from a distance. It should be understood that other mechanisms can be used to provide an indication of the direction of the rotation of the motor such as but not limited to audible notification, different color indicators, directional indicators such as arrows, etc.

Figure 4:
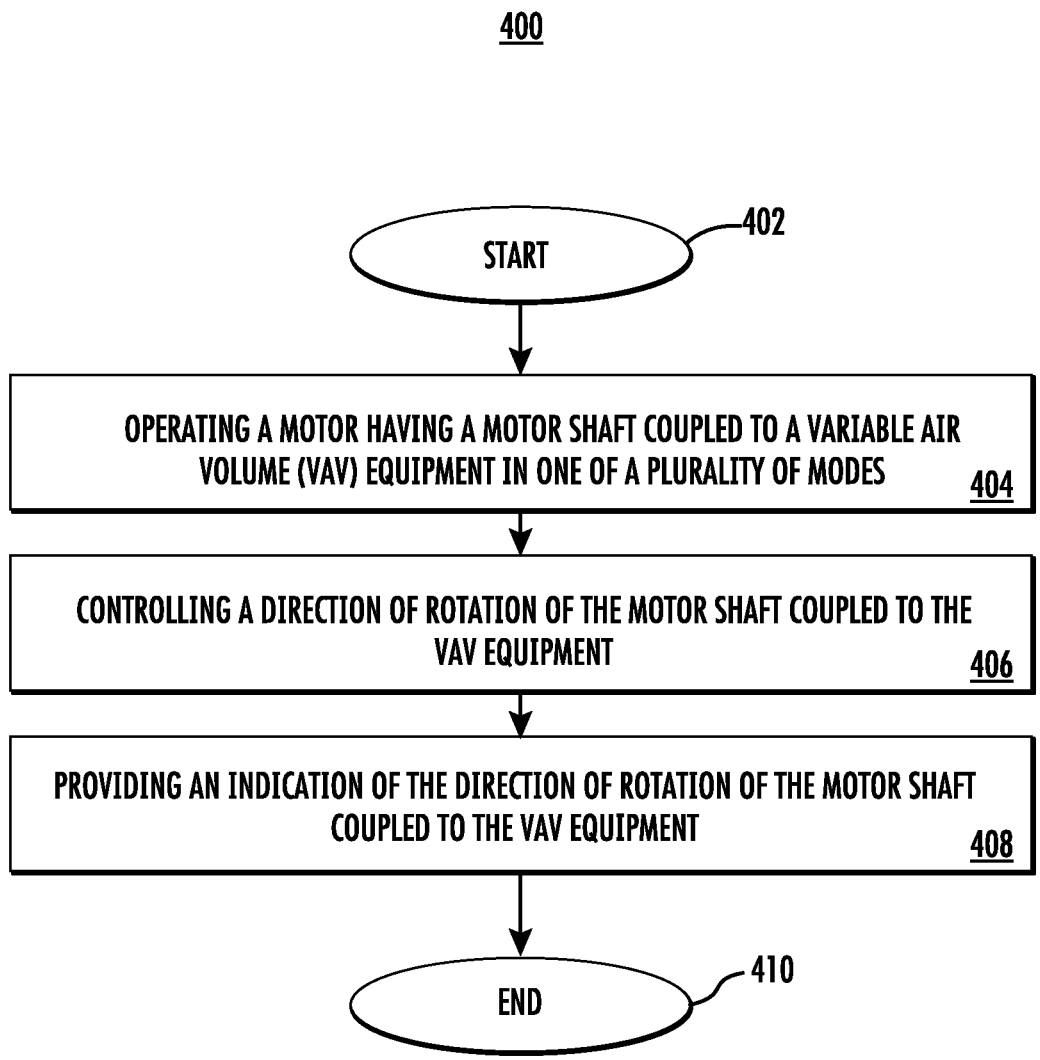
FIG. 4 depicts a flowchart of a method for verifying the operation of VAV equipment in accordance with one or more embodiments of the disclosure.

FIG. 4 depicts a flowchart of a method 400 for verifying operation of VAV equipment in accordance with one or more embodiments of the disclosure. The method 400 can be implemented in a system such as that shown in FIG. 1. The method 400 begins at block 402 and proceeds to block 404 which provides for operating, by a controller, a motor having a motor shaft coupled to VAV equipment in one of a plurality of modes. In one or more embodiments of the disclosure, the plurality of modes includes a verification mode, a location mode, a normal mode, and others. When in the verification mode, the illumination and rotation of the LED array 202 is performed. When in the location mode, the LED array 202 of a particular controller 104 can be illuminated to identify the controller 104 of interest. Subsequently, a different controller 104 of a plurality of controllers 104 can be selected for further inspection.

In a controller locator function mode (location mode), all of the LEDs of the LED array 202 can be turned on and off, remotely from any of the devices connected to the network under the control of the microprocessor in the controller 104 to create a high-intensity strobe. This can be used to visually identify a specific controller 104 in the building or system. The microprocessor can also provide feedback to the serve or user device indicating that the unit is in strobe mode. In the verification mode, the LED array 202 of the controller 104 can be rotated in the direction of the motor to verify the operation of the motor and/or VAV equipment 102.

Block 406 controls, by the controller, a direction of rotation of the motor shaft coupled to the VAV equipment. The controller 104 can provide a signal to control the motor to adjust the position of the damper to control the air flow. Block 408 provides an indication of the direction of rotation of the motor shaft coupled to the VAV equipment. The motor can be rotated in a first clockwise direction and a counterclockwise direction. The LED array can be synchronized and rotated in the direction of the rotation of the motor. The method 400 ends at block 410.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The techniques described herein provide a mechanism that provides a visual indication of damper shaft rotation and identification of a controller. This avoids the need to use a ladder or some other means that must be used to perform a physical inspection of the VAV unit. The techniques described herein allow the technician for verification and installation of the VAV unit. By eliminating the use of ladders the overall service time can be reduced and potential safety issues associated with the user of the ladders can also be reduced.

A detailed description of one or more embodiments of the disclosed apparatus and method are presented herein by way of exemplification and not limitation with reference to the Figures.

The term "about" is intended to include the degree of error associated with the measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for verifying operation of a variable air volume (VAV) equipment, the method comprising:
    operating, by a controller, a motor having a motor shaft coupled to the VAV equipment in one of a plurality of modes;
    controlling, by the controller, a direction of rotation of the motor shaft coupled to the VAV equipment; and
    providing, by the controller, an indication of the direction of rotation of the motor shaft coupled to the VAV equipment;
    wherein the indication is provided by a circular LED array, wherein the circular LED array is illuminated and rotated in the direction of the motor shaft.

2. The method of claim 1, wherein the VAV equipment is a damper, wherein the damper is operable to be rotated in a first direction and a second direction to adjust a volume of airflow.

3. The method of claim 2, further comprising engaging a clutch of the controller to release the motor from a shaft of the VAV equipment.

4. The method of claim 3, wherein the clutch is disengaged, using a push button arranged on the controller, to release the motor from a shaft of the VAV equipment.

5. The method of claim 1 wherein the circular LED array is illuminated and rotated in the direction of the motor shaft by illuminating the LED array in a sequence to indicate a clockwise direction or a counterclockwise direction.

6. A method for verifying operation of a variable air volume (VAV) equipment, the method comprising:
    operating, by a controller, a motor having a motor shaft coupled to the VAV equipment in one of a plurality of modes;

controlling, by the controller, a direction of rotation of the motor shaft coupled to the VAV equipment and providing, by the controller, an indication of the direction of rotation of the motor shaft coupled to the VAV equipment;

wherein the plurality of modes comprises a location mode to identify the VAV equipment, a remote verification mode to confirm operation of the VAV equipment, and a disabled mode to disable the indication of the direction of rotation.

7. The method of claim 6, wherein the location mode illuminates the LED array and operates the LED array as a strobe to identify the controller that is currently being accessed.

8. The method of claim 6, wherein the remote verification mode illuminates the LED array and rotates the LED array in the direction of rotation of the motor shaft.

9. A system for verifying operation of a variable air volume (VAV) equipment, the system comprising:
 a controller;
 the VAV equipment, wherein the controller is coupled to the VAV equipment; and
 an indicator coupled to the controller, wherein the indicator is configured to be illuminated and rotated in a direction of rotation of a motor shaft coupled to the VAV equipment,
 wherein the controller is configured to:
  operate a motor coupled to the VAV equipment in one of a plurality of modes;
  control the direction of rotation of the motor coupled to the VAV equipment; and
  provide an indication of the direction of rotation of the motor coupled to the VAV equipment;
  wherein the indication is provided by a circular LED array, wherein the circular LED array is illuminated and rotated in the direction of the motor shaft.

10. The system of claim 9, wherein the VAV equipment is a damper, wherein the damper is operable to be rotated in a first direction and a second direction.

11. The system of claim 9, wherein the controller is further configured to operate the VAV equipment in at least one of a location mode to identify the VAV equipment or a remote verification mode to confirm operation of the VAV equipment.

12. The system of claim 11, wherein the remote verification mode illuminates and rotates the LED array in the direction of rotation of the motor shaft.

13. The system of claim 9, further comprising a server to configure a mode of operation.

14. The system of claim 9, further comprising a clutch of the controller to release the motor from a shaft of the VAV equipment.

15. The system of claim 14, further comprising a push button configured to disengage the clutch to release the motor from a shaft of the VAV equipment.

16. The system of claim 15, wherein the push button comprises a lens to enable the LED array to be visible external to the controller.

17. A system for verifying operation of a variable air volume (VAV) equipment, the system comprising:
 a controller;
 the VAV equipment, wherein the controller is coupled to the VAV equipment; and
 an indicator coupled to the controller, wherein the indicator is configured to be illuminated and rotated in a direction of rotation of a motor shaft coupled to the VAV equipment,
 wherein the controller is configured to:
  operate a motor coupled to the VAV equipment in one of a plurality of modes;
  control the direction of rotation of the motor coupled to the VAV equipment and
  provide an indication of the direction of rotation of the motor coupled to the VAV equipment;
 wherein the controller is further configured to operate the VAV equipment in a location mode, wherein the location mode illuminates an LED array and operates the LED array as a strobe to identify the controller is being accessed.

* * * * *